United States Patent [19]

Van Aaken et al.

[11] Patent Number: 5,789,493
[45] Date of Patent: Aug. 4, 1998

[54] POWDER PRINT FROM MELT-MIXING AND GRINDING BINDER PARTICLES AND ADDITIVES

[75] Inventors: Josephus M. Van Aaken, Evans. Ga.; Guillaume F. M. Hoedemakers, Geleen. Netherlands; Johannes S. Van Der Bas. Den Haag. Netherlands; Adrianus J. Van De Werff, Zwolle, Netherlands

[73] Assignee: DSM N.V., Heerlen. Netherlands

[21] Appl. No.: 905,153

[22] Filed: Aug. 1, 1997

Related U.S. Application Data

[62] Division of Ser. No. 554,910, Nov. 9, 1995, abandoned, which is a continuation of Ser. No. 59,329, May 11, 1993, abandoned.

[30] Foreign Application Priority Data

Jul. 15, 1993 [NL] Netherlands ............... 9301239
Feb. 4, 1994 [EP] European Pat. Off. ......... 94200332

[51] Int. Cl.⁶ .................. C08K 3/22; C08K 5/07; C08L 67/02
[52] U.S. Cl. ............ 525/438; 525/113; 525/114; 525/117; 525/118; 525/119; 525/440; 525/443; 525/454; 525/456; 525/457; 525/463; 525/465; 525/467; 525/524; 525/534; 523/439; 523/456; 523/458
[58] Field of Search ............... 525/117, 118, 525/119, 438, 113, 114, 440, 443, 454, 456, 457, 463, 465, 467, 524, 534; 523/439, 456, 458

[56] References Cited

U.S. PATENT DOCUMENTS

| | | | |
|---|---|---|---|
| 3,077,461 | 2/1963 | Hood et al. | 260/30.4 |
| 3,102,823 | 9/1963 | Manasia et al. | 117/21 |
| 3,218,274 | 11/1965 | Boller et al. | 260/22 |
| 3,278,469 | 10/1966 | Pascale | 260/21 |
| 3,336,251 | 8/1967 | Manasia et al. | 260/18 |
| 3,344,096 | 9/1967 | Manasia et al. | 260/18 |
| 3,362,922 | 1/1968 | Manasia et al. | 260/18 |
| 3,374,193 | 3/1968 | Tsatsos et al. | 260/18 |
| 3,468,704 | 9/1969 | Graver | 117/161 |
| 3,472,915 | 10/1969 | Rider | 260/839 |
| 3,493,414 | 2/1970 | Hastings | 117/41 |
| 3,576,903 | 4/1971 | Groff | 260/824 |
| 3,650,997 | 3/1972 | Wiesfeld et al. | 260/21 |
| 3,752,870 | 8/1973 | Labana | 260/836 |
| 3,758,334 | 9/1973 | Dehm | 117/100 A |
| 3,758,633 | 9/1973 | Labana | 260/836 |
| 3,787,340 | 1/1974 | Labana | 260/23 XA |
| 3,940,453 | 2/1976 | Labana | 260/836 |
| 3,943,082 | 3/1976 | Smith et al. | 525/108 |
| 3,954,901 | 5/1976 | Watanabe et al. | 260/850 |
| 3,988,288 | 10/1976 | Yamaguchi et al. | 260/37 EP |
| 4,057,607 | 11/1977 | Soehngen et al. | 524/524 |
| 4,147,737 | 4/1979 | Sein | 260/835 |
| 4,255,553 | 3/1981 | Mizumura et al. | 525/438 |
| 4,304,802 | 12/1981 | Mosse | 427/386 |
| 4,463,140 | 7/1984 | Belder et al. | 525/438 |
| 4,542,192 | 9/1985 | Kraft et al. | 525/121 |
| 5,461,089 | 10/1995 | Handyside et al. | 524/599 |

FOREIGN PATENT DOCUMENTS

| | | |
|---|---|---|
| 116852 | 8/1989 | European Pat. Off. |
| 329027 | 8/1989 | European Pat. Off. |
| 365428 | 4/1990 | European Pat. Off. |
| 506617 | 9/1992 | European Pat. Off. |
| 55099 | 4/1967 | German Dem. Rep. |
| 3301729 | 7/1984 | Germany |
| 4032855 | 4/1992 | Germany |
| 74-32998 | 3/1926 | Japan |
| 48-07943 | 8/1979 | Japan |
| 1-229078 | 12/1989 | Japan |
| 1333361 | 10/1973 | United Kingdom |
| 1515541 | 6/1978 | United Kingdom |
| 552109798 | 10/1982 | United Kingdom |
| 1165647 | 10/1989 | United Kingdom |

OTHER PUBLICATIONS

Merck. Powder Paints. "Paint India". 47–52 (Feb. 1992).
Misev. "Powder Coatings, Chemistry and Technology", 44–54, 131–226, 284–303 (1991).
Newman. "Chemistry of Turpenes and Turpenoids", 18–19 (1972).
Surface Coatings. I: 20–38 (1983).
Journal of Coatings Technology, 64:61–64 (Dec. 1992).
Encyclopedia of Polymer Science and Engineering, I:644–79 (1985).
Advances in Polymer Science, 71:182–198 (1985).
Journal of American Oil Chemist' Society, 70:457–460 (May 1993).

*Primary Examiner*—Robert E. Sellers
*Attorney, Agent, or Firm*—Cushman Darby & Cushman IP Group of Pillsbury Madison & Sutro LLP

[57] ABSTRACT

The invention relates to a process for preparing a composition contains a polymer and a crosslinking agent which comprises mixing a polymer that is solid at room temperature with a crosslinking agent, the polymer and the crosslinker having complementary reactive groups, at a temperature at which the viscosity of the polymer (measured according to Emila) is less than 5000 dpas, in a means for achieving a homogeneous composition in such a short time that less than 20% of the reactive groups of one of either the polymer or crosslinking agent has reacted, and subsequently cooling and comminuting the composition.

The mixing is preferably effected in a static mixer at a temperature higher than 140° C.

32 Claims, 1 Drawing Sheet

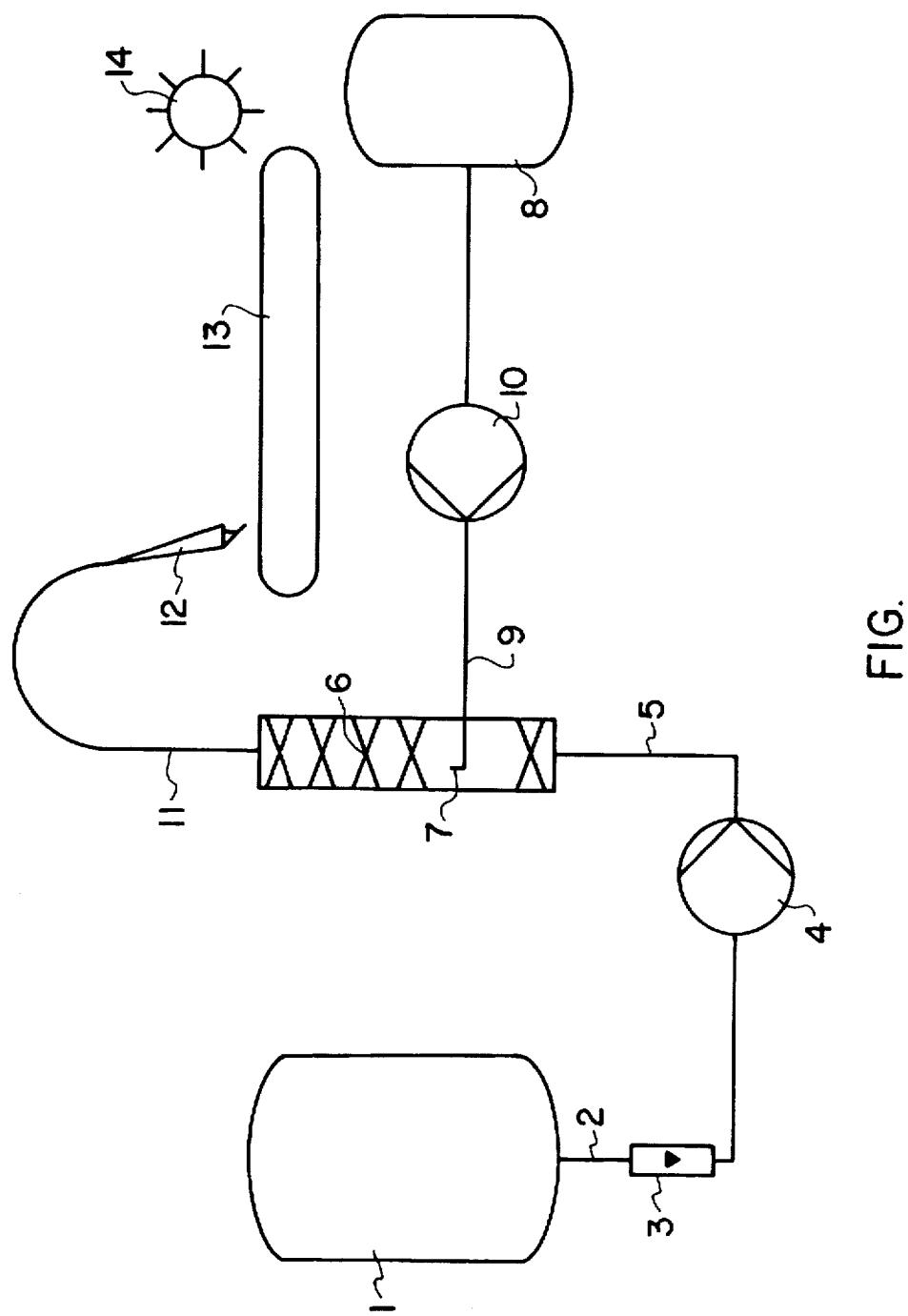
FIG.

POWDER PRINT FROM MELT-MIXING AND GRINDING BINDER PARTICLES AND ADDITIVES

RELATED APPLICATIONS

This is a divisional of application Ser. No. 08/554,910, filed on Nov. 9, 1995, now abandoned, which is a continuation of Ser. No. 08/059,329 filed on May 11, 1993, now abandoned.

BACKGROUND OF THE INVENTION

1. Field of the Invention

The invention relates to a process for the preparation of a thermosetting powder paint binder composition which consists essentially of a polymer and a crosslinking agent.

2. Description of Related Art

Thermosetting powder paints are usually prepared in a series of mixing devices. In a first mixing device, a physical mixture of various powder paint components such as a polymer, a crosslinking agent, pigments, catalysts and additives is prepared. Often, the catalysts and/or additives are added as a mixture with, for instance, (part of) the polymer and that pre-mixture is often times referred to as a so-called 'masterbatch'. The polymer combined with the crosslinking agent has been called the binder composition of the powder paint. The physical mixture obtained from the first mixing device is then mixed in a second mixing device, to a homogeneous mixture at a temperature above the melting point of the polymer. Conventional second mixing devices include extruders or Z-blade mixers. Immediately after the mixing the mixture is cooled, after which the glass-like mixture is crushed and ground.

The conventional process for the manufacture of powder paints is described in, for instance, 'Powder goatings, Chemistry and Technology', by T. Misev (1991), John Wiley & Sons, pp. 224–261.

The currently conventional crosslinking agents are stable powders at room temperature. These agents can be crystalline such as, for instance, triglycidylisocyanurate or amorphous, with a glass transition temperature (Tg) higher than 40° C., such as for instance caprolactam or triazole-blocked isophorone diisocyanate [IPDI] derivatives or epoxy resins on the basis of bisphenol A.

The conventional process suffers from various drawbacks. Of significant concern is an inability to regularly and consistently obtain the desired optimal homogeneity of powder paint particles. In particular, homogeneity of the binder composition components in the resulting powder paint is not optimal. This relative inhomogeneity in the powder paint particles is undesired, and adversely affects the flow, gloss and in particular mechanical properties of the cured powder coating.

Another drawback is that the conventional process precludes the use of significant quantities of liquid components. First, adding liquid components in the first mixing device would interfere with the preparation of the physical mixture of powdered materials. Second, adding liquid components would lead to increased inhomogeneity even in a conventional second mixing device, such as an extruder, because any liquid component would mix relatively poorly with molten, highly viscous, materials in an extruder. Adding a liquid component causes wide residence time distribution, which can result in detonated properties of the final coating, such as for instance detonated mechanical properties, and further, an uneven distribution of the crosslinker in the powder paint. The latter affects the powder stability.

Because of these drawbacks no liquid crosslinking agents are now used in powder coatings.

The invention provides a solution to these problems.

SUMMARY OF THE INVENTION

The present invention provides a process for preparing a homogeneous thermosetting powder paint binder composition consisting essentially of a polymer and a crosslinking agent which comprises mixing a polymer which is solid at room temperature with a crosslinking agent, the polymer and said crosslinking agent having complementary reactive groups, at a temperature at which the viscosity of the polymer is less than 5000 dpas, in a mixing means for achieving a homogeneous composition in such a short time that less than 20% of the reactive groups of either the polymer or the crosslinking agent has reacted, and subsequently cooling and comminuting the composition.

BRIEF DESCRIPTION OF THE DRAWING

FIG. 1 illustrates schematically an embodiment of the present process starting from the polymer production to comminution of a cooled binder composition.

DETAILED DESCRIPTION OF THE PRESENT INVENTION

The viscosity is measured according to Emila by using an Emila rotary viscometer at 158° C. as described in for instance 'Powder Coatings, Chemistry and Technology', by T. Misev, 1991, John Wiley & Sons, pp. 287–288.

In particular, the invention provides a process as described above in which the crosslinking agent is an amorphous substance at room temperature having a glass transition temperature (Tg) of less than 20° C.

As used herein an amorphous substance includes a liquid i.e. an amorphous substance having a melting point lower than 20° C.

The Tg is measured on a differential scanning device, such as for instance a Mettler TA2000 system, with temperature increments of 5° C. per minute.

Unexpectedly very homogeneous binder compositions can be obtained according to the process of the invention. The binder composition appears to be even more homogeneous than a composition of like constituents made using an extruder.

The homogeneity of the composition can be measured for instance on the basis of the variation in the quantity of reactive groups of the polymer and/or the crosslinking agent in the binding agent composition. With the process according to the invention, the variation of this quantity is in general less than 5% relative to the measured type of reactive group. A variation of less than 2% can also be realized with the process according to the invention and is preferred.

Another way of measuring the homogeneity is to use the crosslinker in admixture with a pigment. If the pigment appears to be distributed evenly in the composition, that will be an indication that the crosslinker is also evenly distributed. In case of an inhomogeneous mixture, the pigment appears in stripes. However, these techniques suffers the drawback that the homogeneity is visualised at a micrometer scale or larger.

Based on comparison experiments, compositions obtained according to the process of the present invention cure faster and have better mechanical properties. This is due to a good homogeneity at the molecular level.

The degree of homogeneity can also be derived from the theoretical mixing efficiency of the mixing equipment used. For instance, manufacturers of static mixer equipment can advise on the type of mixer to be used in order to achieve for example about >99% mixing efficiency given amongst others the viscosity of the components.

Advantageously the process according to the invention can be practized using crosslinking agents, such as for instance bisphenol A epoxy resins, because the binder composition exhibits a high degree of homogeneity.

In particular, according to the process of the present invention compositions which are pulverulent at room temperature are obtainable even though they are prepared with a liquid crosslinking agent. Such pulverulent compositions are physically and chemically stable and unexpectedly highly homogeneous.

Powder coating manufacturers can produce powder coating compositions according to the present invention without the necessity of substantial extra investments or capital outlays. An entire category of potential crosslinking agents is applicable.

A binder composition produced by the present process is useful in the preparation of thermosetting powder paints. Powder paints are eventually cured on a substrate into powder coating. During the curing of the final powder coating the polymer and the crosslinking agent should react with each other, while both in the mixing and in the preparation of the powder coating there must not be any substantial reaction as this would negatively affect the flow and the mechanical properties of the powder coating. The mixing in the process according to the invention proceeds so rapidly that the degree of preliminary reaction is such that less than 20%, preferably less than 10%, in particular less than 5% of the reactive groups has reacted.

In general for a binder composition which can be cured without further additions, a mixing time of less than 30–50% of the gelling time corresponds to a preliminary reaction in which about 20% reaction of the reactive groups have reacted.

In order to obtain a powder paint the binder composition has to be solid at room temperature. In general the binder composition has a glass transition temperature (Tg) higher than 20° C., preferably higher than 30° C., in particular higher than 40° C. If crystalline polymers are used, the Tg may be less critical, provided that the polymer can crystallize during the cooling of the binder composition.

The crosslinking agent has a Tg-lowering effect and consequently, the Tg of the polymer should be about 10° to 30° C. higher than the Tg of the binder composition.

In the case of thermosetting powder paints, amorphous polymers are mostly used. In general, the softening range of polymers with a Tg of 30°–60° C. or higher is between 60° C. and 100° C. As a consequence, the polymer has a high viscosity at 100° C. to 120° C., in general at least between 10,000 and 30,000 dpas. This means that in conventional processes for making powder paints extrusion equipment is required to produce powder coatings at these temperatures. Extrusion at higher temperatures might entail a premature curing reaction. Further, the high viscosity and the extrusion equipment contribute towards a good dispersion of the pigment.

According to the present invention the polymer and the crosslinking agent are mixed at a polymer viscosity of less than 5000 dPas (measured according to Emila). This enables the preparation of a high quality binder composition using simple equipment, with a high yield per time unit.

The viscosity of the polymer at the mixing temperature is preferably less than 2500 dPas, in particular less than 1000 dPas. A lower viscosity is advantageous because in general the mixing will be accomplished faster then, so that the mixture can be cooled down fast. The viscosity will in general be higher than 1 or 10 dpas.

Advantages according to the invention are achieved in particular by using as a crosslinking agent an amorphous substance which as such at room temperature cannot be obtained in the form of a physically stable powder.

Such a crosslinking agent has a Tg lower than 20° C. A crosslinking agent having a Tg lower than 20° C. may for instance be a high-viscosity paste or a liquid. Such a crosslinking agent will also be referred to here as 'liquid crosslinking agent'.

The crosslinking agent generally has a viscosity of less than 2000 dPas at 20° C. Liquids having a viscosity of 1 to 3 dpas, such as for instance epoxidized oils, are also very suitable.

Suitable crosslinkers include, for example, epoxidized oils wherein the oil is linseed oil, soybean oil, safflower oil, oiticica oil, caraway seed oil, rapeseed oil, castor oil, dehydrated castor oil, cotton seed oil, wood oil, vernonia oil (a natural oil), sunflower oil, peanut oil, olive oil, soybean leaf oil, maize oil, fish oil such as, for example, herring or sardine oil, and non-cyclic terpene oils. The epoxidized oil is preferably epoxidized soybean oil and/or epoxidized linseed oil.

The crosslinking agent may be heated to a temperature above 60° C. prior to mixing and then—in general—has a viscosity of less than 10 dpas.

The viscosity ratio between the polymer and the crosslinking agent at the mixing temperature is in general lower than $5 \times 10^4$, preferably lower than $10^4$. A consequence of a high viscosity ratio is that the components are harder to mix, although good mixing can generally be achieved in that case as well. In general, the viscosity, ratio is higher than 1. In particular, the viscosity ratio between polymer and crosslinking agent is between 1000 and 10, because then the components are relatively easy to mix.

Generally, the mixing in the process according to the invention is effected at a temperature higher than 140° C., preferably higher than 150° C. In general the mixing is effected at a temperature below 220° C., preferably below 200° C.

In general there is a pressure drop over the mixing device. So a pressure is applied to feed the mixing equipment. The pressure is not critical and may range from vacuum to several 100 bar. The pressure generally is higher than 1.1 bar, and lower than 50 bar. Preferably, the pressure is between 2 and 10 bar (0.2 and 1 MPa).

The process according to the invention is well-suited to be applied immediately after the polymer is prepared because the polymer is synthesized at a relatively high temperature (polyester resins, for instance are prepared at 220°–250° C.). However, this is not a necessity, in particular if the synthesis of the polymer takes place in a solvent. In general, the polymer is brought to the desired temperature by cooling or heating. In general, there is advantage in some preheating of the crosslinking agent to for instance 60°–120° C. in order to prevent strong cooling—and an increase in viscosity—of the polymer when it is mixed. However, cooling can also be prevented by heating the mixing equipment.

In general a mixer that is suitable for the process according to the invention is of such a design that the liquid components substantially pass through the mixer in plug flow.

Accordingly, the mixing equipment is not an extruder and extruders are therefore disclaimed for use in the process according to the present invention.

By preference the mixer is of such a design that—with application of the process according to the invention—the residence time distribution and the flow-through rate (mean residence time) are short. The mean residence time and the residence time distribution can for example be measured by means of tracers. See for this for instance: Perry, Chem. Eng. Handbook, 5th ed., McGraw-Hill, pp. 4–27.

The mean residence time is the time after which—after the injection of a tracer—50% of the tracer has left the mixing equipment.

The residence time distribution (as defined here) is the time from the moment the first quantity of tracer pulse is injected till the moment at which 99% of the tracer has left the device.

The mean residence time can also be calculated by dividing the volume of the equipment (m$^3$) by the sum of the flow rates of all components which are dosed (m$^3$/sec).

Another method to define a residence time distribution is the time elapsed between the mean residence time and the moment at which 99% of the tracer has left the device. In order to differentiate between the two definitions, the latter will be called the residence time variance.

Generally the residence time distribution is less than 60 seconds, preferably less than 30 seconds, in particular less than 20 seconds.

Generally, the mean residence time is less than 60 seconds, preferably less then 30 seconds and in particular less than 20 seconds.

It is further preferred, that the residence time variance is less then about 1 min, preferably less than 30 seconds and in particular less than 20 seconds.

In general, it is preferred to use a temperature at which the viscosity of the polymer is relatively low, since that eases the homogenisation. As a consequence, the mixing should take place rapidly, so that the mixture can be cooled virtually immediately. Otherwise, unwanted pre-reactions may take place. In this case, the figures given for the mean residence time and residence time distribution are in particular applicable. However, in case one would choose a relatively low temperature (e.g. 140° C.) for a process wherein relatively slowly reacting components are used, it may very well be possible to use mean residence time rates of up to 2 minutes, with a residence time distribution in the same order of magnitude. A drawback of such a process may be that the viscosity of the mixture increases and therefore a higher pressure will have to be applied if a static mixer is used or that—in general—higher energy input is required.

In the process according to the invention the mixing of the binder composition takes place within the period of time in which 20% of the reactive groups of one of the components would have reacted. This means that 99% of the mixture feed introduced to the mixer has passed through the mixing device within the desired time and is cooled. Preferably, the mixing takes place in such a short time that less than 10% and in particular less than 5% of the reactive groups of one of the components have reacted.

There may be advantage in allowing some degree of—controlled—preliminary reaction take place.

For instance 4%, 8% or 12% of the components can react with each other, in order to achieve a preliminary reaction. This controlled reaction can be allowed in order to raise the Tg of the binder composition.

The mixing equipment may have a residence time distributionf—with a short mean residence time of about 5 to 10 or up to 30 seconds—of, for instance, almost 40 seconds. If the device has a longer mean residence time, the allowable residence time distribution in the mixing equipment will in general be shorter. Very preferably, the mixing of the binder composition is effected within about 1 min and the equipment preferably is of such a design that after mixing up to cooling essentially no residence time distribution takes place any more.

Exemplary means for achieving a homogeneous composition in the process of the present invention are static or dynamic mixers with a short residence time distribution and mean residence time.

Preferably a static mixer is used. A static mixer requires little maintenance and is hardly subject to wear and a static mixer can handle much material in a short time. Very suitable static mixers are for example a Kenics type mixer, a Sulzer mixer (SMX, SMXL or a SMR) and static mixers of Toray, Erestat, Wymbs Eng. Ltd., Premixer Quarto, Premixer, Ross ISG, Komax, Lightnin, Prematechnik and Bran und Lübbe. A Sulzer SMR-type mixer can be heated or cooled easily if needed.

Kenics type static mixers are described in U.S. Pat. No. 3,286,992, U.S. Pat. No. 3,664,638 and U.S. Pat. No. 3,704,006, the disclosures of which are incorporated herein by reference. Other mixers are described in U.S. Pat. No. 3,404,869, the disclosure of which is incorporated herein by reference.

Suitable dynamic mixers include for example a rotor/stator type mixer and a colloid mill. A rotor/stator mixer is used for the production of oil-in-water emulsions. An advantage of such mixing equipment is that it is simple to clean and thus easy to maintain. The drawback of the dynamic mixers is that they require a supply of energy in order to operate. The energy input causes the temperature of the binder composition to increase, and in practice the temperature increase may be about 20° C. Consequently, the temperature of the components that are fed into the mixing equipment should be lower than their subsequent mixing temperature. For instance, when mixing is carried out at 180° C., the polymer should be supplied at a temperature of 160° C.

In general, mixing equipment which results in at least about 95% mixing efficiency or homogeneity, will be employed in this invention. By preference the mixing equipment is selected to achieve at least 97% mixing efficiency, although an efficiency greater than 99% is most preferred.

The mixing efficiency is related to the variation coefficient which can be defined by the standard deviation of the concentration divided by the average concentration of the mixed components. A variation coefficient of 0.01 is equal to 99% mixing efficiency. A variation coefficient of 0.05 is equal to 95% mixing efficiency. See for example Alloca, P. T., "Mixing efficiency of static mixing units in laminar flow", Fiber Producer April (1982), pages 12–19 and Pahl et al, Chem. Eng. Techn. 51, 5 (1979) pages 347–364, which disclosures are incorporated herein by reference.

This theoretical mixing efficiency should be calculated for the components intended to be used. Thus the efficiency can be calculated for a polymer:crosslinker viscosity ratio of 10$^3$ or 10$^4$. This calculation is readily performed by a man skilled in the art based on the information available from a manufacturer of a given mixer. In general, the mixing efficiency is calculated as a "concentration distribution" ($\sigma$) of mixed ingredients.

In the present process, after mixing, the binder composition is cooled. The binder composition can be fed through piping onto a cooling device. Cooling devices include a cooling belt whereon the binder composition is fed in a thin layer in order of several millimeters. The thin layer can be obtained by using a resin feeder. The binder composition can also be applied in droplet form to the cooling belt. It is also possible to feed the mixture onto the belt in a thick layer, and spreading the mixture by means such as for example a doctor blade or by roll which may be cooled, if desired.

After cooling, the glassy material is comminuted such as by breaking and milling the obtained cooled binder composition.

The precise means for cooling and comminuting is not critical. The warm binder composition may as well be sprayed into a cooling medium by which step cooling and comminuting is achieved concurrently.

The particles of the binder composition obtained generally have sizes between 100 μm–10 mm. In particular, the particle size distribution is such that >95 wt. % of the particles falls within this range. Preferably more than 95 wt. % of the particles are between 100 μm and 5 mm. This is a clear distinction with the particle size of powder paints, which particles have generally sizes <100 μm.

Suitable polymers include all customary polymers that can be used for thermosetting powder coatings, such as for example polyester, polyacrylate, polyether (bisphenol A resins), polyurethane, polycarbonate and polybutadiene. Preferred are polyesters, polyacrylates and polyether resins. In general, the polymer will be amorphous. However, it is equally possible to use crystalline polymers or mixtures of crystalline and amorphous polymers. The polymers have reactive groups for the reaction with a crosslinking agent, whether or not in combination with an extra crosslinking component. Suitable reactive groups include for example carboxyl-, methylol-, carboxyl anhydride-, hydroxy- and/or epoxy-groups but, other reactive groups may also be present. Preferably, the polymers have carboxyl, hydroxy or epoxy groups.

Suitable crosslinking agents are crosslinking agents with customary reactive groups, and mixtures of these. The crosslinking agent is reactive with the polymer and so the crosslinking agent has reactive groups that are complementary or supplementary to those of the polymer. As reactive groups may be present for instance epoxy, thiol, amine, hydroxy, β-hydroxy alkylamide, methylol, (blocked) isocyanate, acid and anhydride groups. Suitable crosslinkers include for example the epoxidised oils, bisphenol-A-epoxides, cycloaliphatic epoxides, trimer of hexanediisocyanate, hexamethylmelamine, dodecanedicarboxylic acid and the reaction product of fatty amines with polyglycidyl compounds.

As a matter of course, an extra crosslinking component may be added during the preparation of the final powder coating. For the purpose of the present invention, a crosslinking agent is also understood to be a combination of a crosslinking agent and a polymer, and in which the combination the reactive groups of the polymer and the crosslinking agent not reacting with each other directly, but via a third component. For instance, a binding composition according to the invention can be prepared by mixing a bisphenol A epoxy resin with a (liquid) polyepoxy compound. In the preparation of such a powder paint, for instance a (solid) dicyandiamide and its derivatives or a polyanhydride compound may be added as extra crosslinking component.

The binder composition will usually contain more than 2 wt. % of either crosslinking agent or a mixture of crosslinking agents. By preference more than 3 wt. % and in particular more than 4 wt. % is used, because then the advantages of the invention are utilized properly. The amount of crosslinking agent or mixture of crosslinking agents will be generally less than 30 wt. %, preferably less than 20%, in particular less than 15%, because then the Tg of the binder composition is lowered less strongly.

There may be advantage in adding antioxidants, stabilizers and other additives to the binder composition. Very suitable additives include for example additives which improve the tribocharging properties of a polyester/epoxy system and additives which inhibit discoloration that may be caused by overbake or hardening in a gas oven.

In a first preferred embodiment of the invention the binder composition preferably contains no effective amount of catalyst and/or extra crosslinking component (with regard to the finally desired curing reaction). As a result the composition is chemically very stable during further storage until it is processed to a powder coating, and generally, the mixing time is less critical because the time till 20% preliminary reaction at the mixing temperature is relatively long, for instance a few minutes. In this embodiment, the binder composition may contain for instance a blocked catalyst.

In a second preferred embodiment of the invention the binder composition additionally contains a catalyst, because this makes the preparation of the powder paint easier. The presence of a catalyst may make the process according to the invention critical with respect to curing reactions, but this can easily be determined by one skilled in the art.

With the binder composition, obtained by the process according to the invention, a powder paint can be prepared in the known manner (see for example page 227 of the already cited "Powder Coatings" by Misev). Generally, this process comprises physical mixing (in powder form) of pigment, binder, fillers and additives in a first device. The additives may comprise a flow-promoting agent, a degassing agent and if desired a stabilizer, a catalyst and/or an extra crosslinking component, if these are not already present in the binder composition. Optionally, the additives and the pigment as well—if so desired—may be used in the form of a masterbatch with a certain amount of polymer.

The polymer in the masterbatch is usually applied in a quantity of less than approximately 15 wt. % relative to the binder composition in the preparation of the powder paint. Preferably, the amount of polymer contained in the masterbatch is less than 10 wt.%, relative to the rest of the binder composition, in the final powder paint composition.

Thereafter, the physical mixture is melt mixed e.g. in an extruder, cooled, ground and the particles with a size <100 μm are sieved.

WO 92/00342 discloses a process to produce by melt atomisation, without cooling and comminution, a powder paint composition which is suitable for application as a powder coating composition. WO 92/00342 relates to a process for the preparation of a powder paint as a whole. In one form of the process according to WO 92/00342 a molten composition mixture may be formed in a mixer, such as for example a static mixer, immediately upstream of the atomiser. An atomiser will not result in a substantially homogeneous mixture. The individual components of the composition may be fed to the mixer by way of an extruder. Because of the relatively high temperature and the presence of a catalyst there will be preliminary reaction in the mixer. In contrast, the present invention provides a process for the preparation of a binder composition substantially consisting of only the polymer and the crosslinking agent. After mixing the binder composition is cooled. Starting from a binder composition obtained by the process according to the invention which uses for example a static mixer, a powder paint can be obtained.

The use of a static mixer in the preparation of powder coatings is also known as such from U.S. Pat. No. 3,940,453. However, U.S. Pat. No. 3,940,453 does not provide a process for preparation of only the binder composition, substantially consisting of only the polymer and the crosslinking agent, but it relates to a process for preparation of the powder coating as a whole. A drawback of the process according to U.S. Pat. No. 3,940,453 is that for each powder coating, with its own proportions of pigments, fillers and additives, the supply of crosslinking agent has to be controlled precisely. In the process according to the invention the problem created by the process according U.S. Pat. No. 3,940,453 is avoided by adding a constant quantity of crosslinking agent to a polymer, independent of the many types of powder coating that can be made from it. Another disadvantage of the process described in U.S. Pat. No. 3,940,453 is that pigments have to be dispersed in a polymer solution and that the solvent has to be evaporated out.

The invention also relates to a process for the preparation of a powder paint which process comprises the preparation of a binder composition as claimed, mixing the communited binder composition with one or more compounds choosen from the group consisting of pigments, fillers and additives, melt-mixing the mixture, cooling, grinding and sieving particles with a size smaller than 100 µm.

The invention will be elucidated by means of FIG. 1 which schematically depicts an embodiment of the present process starting from the polymer production to comminution of a cooled binder composition.

In FIG. 1 a polymer is produced in the reactor (1). Via line (2), which is provided with means to keep the line and the polymer at the desired temperature (tracing), the polymer is sent to a metering pump (4) via a volumeter (3). The metering pump should be sufficiently precise to allow an accurate feed of the components to be mixed. Preferably, the pumps have an accuracy of better than 5% in particular better than 3%. Via line (5) the polymer is supplied to the static mixer (6). The static mixer (6) has a feed point (7) where a crosslinking agent, from storage vessel (8) and having the desired temperature, is supplied via line (9) and metering pump (10). Via line (11) and resin feeder (12) the homogeneous binder composition is poured out on cooling belt (13) and cooled. Line (11) and resin feeder (12) may if desired be slightly cooled in order to inhibit preliminary reaction. The cooled binder composition is comminuted by means of crusher (14).

The invention is described further with reference to the following non-limiting examples.

EXAMPLE I

A polyester resin having an acid number of 26 mg KOH/gram resin and a viscosity of 220 dPas (Emila) at 180° C. was supplied to a static mixer at a temperature of about 175° C., in which it was mixed with 8.9 wt. % of epoxidized linseed oil that had been heated to 100° C. The residence time of the mixture in the static mixer was about 13 seconds. The static mixer was a Sulzer SMX having a diameter of 27.3 mm and a length of 40 cm. The throughput was 60 liters/h with a pressure drop across the mixer of 1 bar. The mixing time (mean residence time), from the moment of feeding in of the crosslinking agent to cooling on the cooling belt, was 20–60 seconds, depending on the shape of the resin feeder. The time needed for cooling to 40° C. was 1½ minutes. The cooling belt used was cooled with water. The cooling belt ran at a speed of 1.3 m/min. and the length of the belt was 1.85 m. At the end of the cooling belt the glassy material was crushed to particles having a size of 5–30 mm.

Analysis of the quantity of epoxy and acid groups showed that the composition was very homogeneous and that less than 7% of the epoxy groups had reacted.

A mixture of a polyester and epoxidized linseed oil can be heated to 190° C. for a few minutes before more than 5 to 10% of the epoxy groups has reacted. In contrast, a binder composition comprising, for instance, TGIC and an acid polyester can have a gelling time of 120 seconds at 160° C. In such a case the mixing would preferably have to be effected within 20 to 30 seconds.

Starting from the binder composition as described above, a powder paint was made by mixing at 120° C. 600 parts by wt. of binding agent, 300 parts by wt. of TiO$_2$, 9 parts by wt. of Resiflow PV5® (flow-promoting agent), 4.5 parts by wt. of benzoin, 3.0 parts by wt. of tetramethyl guanidine (catalyst) and 3.0 parts by wt. of Irganox 245® (stabilizer) at 120° C. in a Buss continuous kneader. The homogeneous mixture was cooled, crushed and ground, and a powder with particles of 50–90 µm was screened out. This powder coating had a gel time of 65 seconds, a glass transition temperature of 42° C. and a curing time of 6 minutes at 200° C.; the impact strength (reversed impact) was 160 in.lb. The gloss of the cured coating was 74% at 200 (measured in accordance with ASTM-D-523) and the appearance was very good.

This shows that an excellent powder paint can be produced with the binding agent obtained by the process according to the invention.

EXAMPLE II

In a manner, analogous to Example I, a binder composition was prepared. The binder contained 8.2 wt. % epoxidized linseed oil. The binder was used for the preparation of a powder paint using an extruder (Werner & Pfleiderer, 120° C., 200 RPM) with an through-put of 12.5 kg/h.

COMPARATIVE EXPERIMENT A

In this Comparative Experiment, the epoxidized linseed oil was pumped into the extruder while preparing a powder paint with exactly the same constituents as in Example II.

The powder paints obtained according to Example II and Comparative Experiment A were applied to a metal plate, and the mechanical properties were measured. Results are shown in Table 1.

TABLE 1

|  | II | A |
| --- | --- | --- |
| minimal temperature necessary for full impact | 174° C. | 179° C. |
| max. thickness for impact (µm) |  |  |
| 10'/180° C. | 65 | 48 |
| 10'/200° C. | >82 | 67 |

The tests show, that the mechanical properties of the powder coating made with the process according the invention are better.

The first test states the minimal temperature, necessary to achieve full impact (160 inch/pound). This test was performed by curing a coating or a gradient-plate.

In the second test the maximum thickness of a coating was measured at which full impact still was achieved (thicker coatings tend to have less good mechanical properties). Here it appeared, that with the powder coating of Example II in comparison with Experiment A thicker coatings passed the impact test.

EXAMPLE III AND COMPARATIVE EXPERIMENT B

In a manner analogous to Example I and II, powder paints were prepared. However, use was made of a Buss extruder (75 RPM, 116° C.).

The powder paint for the comparitive experiment B was made by physically blending the epoxidized linseed oil with the resin, pigment and other additives before extrusion. The amount of epoxidized oil was 8.56 wt. % in the binder compositions.

The results are shown in Table 2.

TABLE 2

|  | III | B |
| --- | --- | --- |
| gel time (s) | 74' | 93' |
| minimum temperature necessary for full impact | 180° C. | 183° C. |
| max. thickness for impact 10'/180° C. | 60 μm | <42 μm |

From these results it is also apparent, that mechanical properties are better if a powder coating is prepared with a binder composition obtained according the process of the present invention.

EXAMPLE IV

A polyester resin having a viscosity of 150 dPas (Emila) at 180° C. was supplied to a rotor/stator system (IKA Dispax DR 3/6/246) at a temperature of about 170° C., in which it was mixed that 9.5 wt. % of epoxidized linseed oil that had been heated to 100° C. The residence time of the mixture in the rotor/stator was about 2-3 seconds. The throughput was 1000 liters/h. The temperature of the mixture flowing out of the rotor/stator was about 190° C. The mean residence time, from the moment of feeding in of the crosslinking agent to cooling on the cooling belt, was about 10–15 seconds. The time needed for cooling to 40° C. was 1.5 minutes. The epoxidized linseed oil was colored with the fluorescent coloring matter sudanred (1 gram sudan-red per 10 kilogram epoxidized linseed oil). The obtained mixed resin-crosslinker product was analysed with fluorescent light microscopy and with confocal scanning laser microscopy. Both techniques showed no concentration differences of fluorescent substances in the product on a large scale as well as on microscale. Consequently the colored epoxidized linseed oil was homogeneously mixed with the resin.

We claim:

1. A process for preparing a powder paint, which process consists essentially of:

mixing in a mixing device that is not an extruder:
a thermosetting polymer having groups reactive with the crosslinking agent selected from the group consisting of polyester, polyacrylate, polyether, polyurethane, polycarbonate and polybutadiene; and
a crosslinking agent with a Tg of less than 20° C. or a viscosity at 20° C. of less than 2000 dPas, and having groups reactive with the polymer,
at a temperature wherein the viscosity of said polymer (measured according to Emila) is less than 5000 dPas and the mixing time is such that less than 20% of the reactive groups of either said polymer or said crosslinking agent have reacted;

cooling the mixed composition;

comminuting the cooled composition to particles which form a binder composition;

melt-mixing the binder composition and at least one member selected from the group consisting of pigment, filler, catalyst, flow-promoting agent, and additives other than pigment, filler, catalyst ad flow-romotin agent; and cooling and grinding the melt mixture to obtain powder paint composition.

2. A process according to claim 1, wherein the mixing is effected with a residence time distribution of less than 60 seconds.

3. A process according to claim 1, wherein the mixing is effected with a mean residence time of less than 60 seconds.

4. A process according to claim 1, wherein said mixing devices comprise mixing equipment which is designed to achieve at least 97% mixing efficiency.

5. A process according to claim 1, wherein said mixing device is a static mixer.

6. A process according to claim 1, wherein the mixing is effected at a temperature between 140° C. and 220° C.

7. A process according to claim 1, wherein the mixing is effected at a temperature at which the polymer has a viscosity lower than 1000 dpas.

8. A process according to claim 1, wherein at the mixing temperature the viscosity ratio between the polymer and the crosslinking agent is less than $10^4$.

9. A process according to claim 1, wherein the crosslinking agent is heated to 60°–120° C. before being mixed with the polymer.

10. A process according to claim 1, wherein the polymer has a Tg higher than 30° C.

11. A process according to claim 1, wherein between 2 and 30 wt. % crosslinking agent and from about 70 to about 98 wt. % of polymer are mixed.

12. A process according to claim 1, wherein the binder composition is free of catalyst for curing the composition to a powder coating.

13. A process according to claim 1, wherein the binder composition is comminuted to particles whereby more than 95 wt. % of the particles have a size between 0.1 mm and 5 mm.

14. A process according to claim 1, wherein said crosslinking agent has has groups reactive with the polymer selected from the group consisting of epoxy, thiol, amine, hydroxy, β-hydroxy alkylamide, methylol, isocyanate, blocked isocyanate, acid and anhydride groups.

15. A process according to claim 1, wherein said crosslinking agent is selected from the group consisting of epoxidized oil, bisphenol-A-epoxide, a cycloaliphatic epoxide trimer of hexanediisocyanate, hexamethylmelamine, dodecanedicarboxylic acid, and the reaction product of fatty amines with polyglycidyl compounds.

16. A process according to claim 14, wherein said mixing device comprises a static mixer.

17. A process according to claim 14, wherein said mixing device comprises a dynamic mixer.

18. A process according to claim 1, wherein said binder composition particles have having sizes between 100 μm–10 mm.

19. The process of claim 1, wherein said polymer comprises at least one carboxyl, methylol, carboxyl anhydride, hydroxy, or epoxy reactive group.

20. The process of claim 1, wherein said polymer is a solid at room temperature.

21. A process for preparing a powder paint comprising the steps of:

(a) preparing a homogeneously mixed composition in a mixing device which is not an extruder, from constituents which consist essentially of at least one polymer having groups reactive with the crosslinking agent selected from the group consisting of polyester, polyacrylate, bisphenol A resin, polyurethane, polycarbonate and polybutadiene, and a crosslinking agent, with a Tg of less than 20° C. and having groups reactive with the polymer, said polymer having reactive groups and said crosslinking agent having reactive groups capable of reacting with the reactive groups of said polymer, at a temperature at which the viscosity of said polymer (measured according to Emila) is less than 5000 dPas, wherein the residence time of said composition within the mixing device is such that less then 20% of the reactive groups of either said polymer or said crosslinking agent have reacted;

(b) cooling the composition;

(c) comminuting the composition to particles wherein more than 95 wt. % of said particles have a particle size between 0.1 mm and 10 mm;

(d) melt-mixing the comminuted composition and at least one, member selected from the group consisting of pigment, filler, catalyst, flow-promoting agent, and additives other than pigment, filler, catalyst and flow-promoting agent;

(e) cooling the obtained melt mixture; and (f) grinding it to particles.

22. A process for preparing a powder paint according to claim 21, wherein said mixed composition is a statically mixing device is a static mixer or a dynamic mixer.

23. A process according to claims 21 or 22, wherein said process comprises the further step of (g) sieving the particles from step (f) with a particle size less than 100 µm.

24. A process according to claims 21 or 22, wherein said melt-mixing is carried out using an extruder.

25. A process according to claim 22, wherein step (a) said composition has a mean residence time of less than 60 seconds within a static mixer or dynamic mixer.

26. A process according to claim 25, wherein said process comprises the further step of (g) sieving the particles from step (f) with a particle size less than 100 µm.

27. A process according to claims 21 or 22, wherein more than 95 wt. % of the particles resulting from step (c) have a particle size of between 0.1 mm and 5 mm.

28. A process according to claim 22, wherein step (d) said at least one member is present in a master batch, with a separate amount of said polymer, and said master batch is melt-mixed with said comminuted composition from step (c).

29. A process according to claims 21 or 22, wherein said crosslinking agent comprises epoxidized oil.

30. A process according to claim 21, wherein said crosslinker is amorphous at is 15° C. to 25° C.

31. A process according to claims 1 or 21, wherein said polymer is a polyester.

32. A process according to claim 31, wherein said crosslinking agent is at least one epoxidized oil.

* * * * *